(12) United States Patent
Hatlelid

(10) Patent No.: US 7,979,911 B2
(45) Date of Patent: *Jul. 12, 2011

(54) FIRST COMPUTER PROCESS AND SECOND COMPUTER PROCESS PROXY-EXECUTING CODE FROM THIRD COMPUTER PROCESS ON BEHALF OF FIRST PROCESS

(75) Inventor: Kristjan E. Hatlelid, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1090 days.

This patent is subject to a terminal disclaimer.

(21) Appl. No.: 11/139,947

(22) Filed: May 27, 2005

(65) Prior Publication Data

US 2005/0222960 A1    Oct. 6, 2005

Related U.S. Application Data

(63) Continuation-in-part of application No. 10/681,017, filed on Oct. 8, 2003, now Pat. No. 7,788,496.

(51) Int. Cl.
*G06F 7/04* (2006.01)

(52) U.S. Cl. .................. 726/28; 726/27; 726/2; 705/59; 705/51

(58) Field of Classification Search .................. 726/2, 26
See application file for complete search history.

(56) References Cited

U.S. PATENT DOCUMENTS

| | | |
|---|---|---|
| 3,718,906 A | 2/1973 | Lightner |
| 4,323,921 A | 4/1982 | Guillou |
| 4,528,643 A | 7/1985 | Freeny, Jr. |
| 4,658,093 A | 4/1987 | Hellman |
| 4,683,553 A | 7/1987 | Mollier |
| 4,780,821 A | 10/1988 | Crossley |
| 4,827,508 A | 5/1989 | Shear |
| 4,916,738 A | 4/1990 | Chandra et al. |
| 4,926,479 A | 5/1990 | Goldwasser et al. |
| 4,953,209 A | 8/1990 | Ryder, Sr. et al. |
| 4,977,594 A | 12/1990 | Shear |
| 5,050,213 A | 9/1991 | Shear |

(Continued)

FOREIGN PATENT DOCUMENTS

CN    1500242 A  *  5/2004

(Continued)

OTHER PUBLICATIONS

In the United States Patent and Trademark Office, Final Office Action, In re:. U.S. Appl. No. 11/273,775, filed Nov. 14, 2005, Dated Jun. 19, 2008, 15 pages.

(Continued)

*Primary Examiner* — Pramila Parthasarathy

(74) *Attorney, Agent, or Firm* — Woodcock Washburn LLP

(57) ABSTRACT

A first computer process has code including at least one triggering device, and a digital license corresponding to the first process sets forth terms and conditions for operating same. A second computer process proxy-executes code corresponding to each triggering device of the first process on behalf of same. The second process includes a license evaluator for evaluating the license to determining that the first process is to be operated in accordance with the terms and conditions set forth in such license. A third computer process includes the code corresponding to each triggering device of the first process and an address of the triggering device in the first process. Thus, the first process is dependent on and cannot be operated without the second process and the third process.

13 Claims, 8 Drawing Sheets

U.S. PATENT DOCUMENTS

| | | | |
|---|---|---|---|
| 5,103,392 | A | 4/1992 | Mori |
| 5,103,476 | A | 4/1992 | Waite et al. |
| 5,109,413 | A | 4/1992 | Comerford et al. |
| 5,117,457 | A | 5/1992 | Comerford et al. |
| 5,138,712 | A | 8/1992 | Corbin |
| 5,193,573 | A | 3/1993 | Chronister |
| 5,204,897 | A | 4/1993 | Wyman |
| 5,222,134 | A | 6/1993 | Waite et al. |
| 5,261,002 | A | 11/1993 | Perlman et al. |
| 5,294,792 | A | 3/1994 | Lewis et al. |
| 5,319,705 | A | 6/1994 | Halter et al. |
| 5,339,426 | A | 8/1994 | Aoshima |
| 5,375,240 | A | 12/1994 | Grundy |
| 5,408,250 | A | 4/1995 | Bier |
| 5,410,598 | A | 4/1995 | Shear |
| 5,434,594 | A | 7/1995 | Martinelli et al. |
| 5,473,692 | A | 12/1995 | Davis |
| 5,485,607 | A | 1/1996 | Lomet et al. |
| 5,490,216 | A | 2/1996 | Richardson, III |
| 5,509,070 | A | 4/1996 | Schull |
| 5,608,894 | A * | 3/1997 | Kawakami et al. ............ 717/162 |
| 5,629,980 | A | 5/1997 | Stefik et al. |
| 5,634,012 | A | 5/1997 | Stefik et al. |
| 5,638,443 | A | 6/1997 | Stefik et al. |
| 5,652,412 | A | 7/1997 | Lazzouni et al. |
| 5,671,396 | A | 9/1997 | Gavish |
| 5,673,316 | A | 9/1997 | Auerbach et al. |
| 5,710,887 | A | 1/1998 | Chelliah et al. |
| 5,715,403 | A | 2/1998 | Stefik |
| 5,729,251 | A | 3/1998 | Nakashima |
| 5,765,152 | A | 6/1998 | Erickson |
| 5,809,144 | A | 9/1998 | Sirbu et al. |
| 5,845,281 | A | 12/1998 | Benson et al. |
| 5,867,699 | A | 2/1999 | Kuslak et al. |
| 5,892,900 | A | 4/1999 | Ginter et al. |
| 5,917,912 | A | 6/1999 | Ginter et al. |
| 5,933,497 | A | 8/1999 | Beetcher et al. |
| 5,953,420 | A | 9/1999 | Matyas, Jr. et al. |
| 5,956,505 | A | 9/1999 | Manduley |
| 5,991,790 | A | 11/1999 | Shah et al. |
| 6,006,328 | A | 12/1999 | Drake |
| 6,073,124 | A | 6/2000 | Krishnan et al. |
| 6,078,909 | A | 6/2000 | Knutson |
| 6,094,487 | A | 7/2000 | Butler et al. |
| 6,130,666 | A | 10/2000 | Persidsky |
| 6,189,146 | B1 | 2/2001 | Misra et al. |
| 6,219,652 | B1 | 4/2001 | Carter et al. |
| 6,226,618 | B1 | 5/2001 | Downs et al. |
| 6,233,567 | B1 | 5/2001 | Cohen |
| 6,243,480 | B1 | 6/2001 | Zhao et al. |
| 6,289,452 | B1 | 9/2001 | Arnold et al. |
| 6,330,670 | B1 | 12/2001 | England et al. |
| 6,343,280 | B2 | 1/2002 | Clark |
| 6,389,538 | B1 | 5/2002 | Gruse et al. |
| 6,405,316 | B1 | 6/2002 | Krishnan et al. |
| 6,486,875 | B1 | 11/2002 | O'Donnell, Jr. |
| 6,502,102 | B1 | 12/2002 | Haswell et al. |
| 6,574,609 | B1 | 6/2003 | Downs et al. |
| 6,574,612 | B1 | 6/2003 | Baratti et al. |
| 6,668,325 | B1 * | 12/2003 | Collberg et al. ............ 713/194 |
| 6,671,813 | B2 | 12/2003 | Ananda |
| 6,681,017 | B1 | 1/2004 | Matias et al. |
| 6,683,546 | B1 * | 1/2004 | Torrubia-Saez ................ 341/51 |
| 6,686,579 | B2 | 2/2004 | Fagin et al. |
| 6,701,514 | B1 | 3/2004 | Haswell et al. |
| 6,718,535 | B1 | 4/2004 | Underwood |
| 6,772,340 | B1 | 8/2004 | Peinado et al. |
| 6,775,728 | B2 | 8/2004 | Zimmer et al. |
| 6,806,868 | B2 | 10/2004 | Chuang |
| 6,810,389 | B1 | 10/2004 | Meyer |
| 6,829,708 | B1 | 12/2004 | Peinado et al. |
| 6,831,632 | B2 | 12/2004 | Vardi |
| 6,832,319 | B1 | 12/2004 | Bell et al. |
| 6,845,908 | B2 | 1/2005 | Morita et al. |
| 6,931,542 | B1 * | 8/2005 | Gregoire ...................... 713/193 |
| 6,933,919 | B1 | 8/2005 | Anderson et al. |
| 6,956,564 | B1 | 10/2005 | Williams |
| 6,959,441 | B2 | 10/2005 | Moore |
| 6,961,941 | B1 | 11/2005 | Nelson et al. |
| 7,030,864 | B2 | 4/2006 | Yueh |
| 7,069,595 | B2 | 6/2006 | Cognigni et al. |
| 7,098,894 | B2 * | 8/2006 | Yang et al. |
| 7,109,979 | B2 * | 9/2006 | Moyne et al. |
| 7,111,285 | B2 | 9/2006 | Smith et al. |
| 7,116,427 | B2 * | 10/2006 | Baney et al. |
| 7,117,285 | B2 | 10/2006 | Ota |
| 7,149,832 | B2 * | 12/2006 | Wieland et al. |
| 7,165,174 | B1 | 1/2007 | Ginter et al. |
| 7,225,165 | B1 * | 5/2007 | Kyojima et al. |
| 7,305,710 | B2 * | 12/2007 | Athens et al. ................... 726/26 |
| 7,356,709 | B2 | 4/2008 | Gunyakti et al. |
| 7,379,918 | B2 | 5/2008 | Tan et al. |
| 7,380,269 | B2 * | 5/2008 | Zvi et al. |
| 7,458,100 | B2 | 11/2008 | Jascau et al. |
| 7,483,018 | B2 * | 1/2009 | Oliver |
| 7,500,245 | B2 * | 3/2009 | Ben-Zvi |
| 7,644,442 | B2 | 1/2010 | Miller et al. |
| 7,656,395 | B2 * | 2/2010 | Pope et al. |
| 7,788,496 | B2 * | 8/2010 | Lelikov et al. |
| 2001/0013025 | A1 * | 8/2001 | Ananda ........................ 705/60 |
| 2001/0034861 | A1 | 10/2001 | Kang |
| 2001/0035861 | A1 | 11/2001 | Ericson et al. |
| 2001/0052077 | A1 | 12/2001 | Fung et al. |
| 2001/0056539 | A1 | 12/2001 | Pavlin et al. |
| 2002/0005834 | A1 | 1/2002 | Oh |
| 2002/0006204 | A1 | 1/2002 | England et al. |
| 2002/0007456 | A1 | 1/2002 | Peinado et al. |
| 2002/0010863 | A1 | 1/2002 | Mankefors |
| 2002/0012432 | A1 | 1/2002 | England et al. |
| 2002/0013772 | A1 | 1/2002 | Peinado |
| 2002/0019887 | A1 | 2/2002 | Moore |
| 2002/0069172 | A1 | 6/2002 | Omshehe et al. |
| 2002/0099663 | A1 | 7/2002 | Yoshino et al. |
| 2002/0136407 | A1 | 9/2002 | Denning et al. |
| 2002/0138735 | A1 | 9/2002 | Felt et al. |
| 2002/0141582 | A1 | 10/2002 | Kocher et al. |
| 2002/0146121 | A1 | 10/2002 | Cohen |
| 2002/0169974 | A1 | 11/2002 | McKune |
| 2002/0174356 | A1 | 11/2002 | Padole et al. |
| 2003/0014655 | A1 | 1/2003 | England et al. |
| 2003/0028488 | A1 | 2/2003 | Mohammed et al. |
| 2003/0046238 | A1 | 3/2003 | Nonaka et al. |
| 2003/0078853 | A1 | 4/2003 | Peinado et al. |
| 2003/0081785 | A1 | 5/2003 | Boneh et al. |
| 2003/0084306 | A1 | 5/2003 | Abburi et al. |
| 2003/0093685 | A1 | 5/2003 | Tobin |
| 2003/0112220 | A1 | 6/2003 | Yang et al. |
| 2003/0145314 | A1 | 7/2003 | Nguyen et al. |
| 2003/0182431 | A1 | 9/2003 | Sturniolo et al. |
| 2003/0187801 | A1 | 10/2003 | Chase, Jr. et al. |
| 2003/0194092 | A1 | 10/2003 | Parks et al. |
| 2003/0194094 | A1 | 10/2003 | Lampson et al. |
| 2003/0195855 | A1 | 10/2003 | Parks et al. |
| 2003/0217011 | A1 | 11/2003 | Peinado et al. |
| 2003/0233573 | A1 | 12/2003 | Phinney |
| 2003/0236978 | A1 | 12/2003 | Evans et al. |
| 2004/0001594 | A1 | 1/2004 | Krishnaswamy et al. |
| 2004/0003264 | A1 | 1/2004 | Zeman et al. |
| 2004/0027377 | A1 | 2/2004 | Hays et al. |
| 2004/0054930 | A1 | 3/2004 | Walker et al. |
| 2004/0088730 | A1 | 5/2004 | Gopalan et al. |
| 2004/0135776 | A1 | 7/2004 | Brouhon |
| 2004/0181772 | A1 | 9/2004 | Pensak et al. |
| 2004/0193545 | A1 | 9/2004 | Shlasky |
| 2005/0044191 | A1 | 2/2005 | Kamada et al. |
| 2005/0044367 | A1 | 2/2005 | Gasparini et al. |
| 2005/0060462 | A1 | 3/2005 | Ota |
| 2005/0074125 | A1 | 4/2005 | Chavanne et al. |
| 2005/0114683 | A1 | 5/2005 | Jin et al. |
| 2005/0132347 | A1 | 6/2005 | Harper et al. |
| 2005/0183072 | A1 | 8/2005 | Horning et al. |
| 2005/0216420 | A1 | 9/2005 | Padole et al. |
| 2005/0246286 | A1 | 11/2005 | Ebihara et al. |
| 2005/0251808 | A1 * | 11/2005 | Gbadegesin et al. ......... 719/310 |
| 2006/0005251 | A1 | 1/2006 | Wu et al. |
| 2006/0026604 | A1 | 2/2006 | Tan et al. |
| 2006/0028442 | A1 | 2/2006 | Bynum et al. |

| | | | |
|---|---|---|---|
| 2006/0069653 | A1 | 3/2006 | Lelikov et al. |
| 2006/0106725 | A1 | 5/2006 | Finley et al. |
| 2006/0109262 | A1 | 5/2006 | Yeh |
| 2006/0112241 | A1 | 5/2006 | Weiss et al. |
| 2006/0123400 | A1 | 6/2006 | Burdick et al. |
| 2006/0173788 | A1 | 8/2006 | Nath Pandya et al. |
| 2006/0195906 | A1 | 8/2006 | Jin et al. |
| 2006/0242081 | A1 | 10/2006 | Ivanov et al. |
| 2007/0005504 | A1 | 1/2007 | Chen et al. |
| 2007/0074223 | A1 | 3/2007 | Lescouet et al. |
| 2007/0234430 | A1 | 10/2007 | Goldsmid et al. |

FOREIGN PATENT DOCUMENTS

| | | | |
|---|---|---|---|
| EP | 0715246 A1 * | 6/1996 | |
| EP | 0715247 A1 * | 6/1996 | |
| JP | 2006011509 | 1/2006 | |
| WO | WO 93/01550 A1 * | 1/1993 | |
| WO | WO 96/13013 A1 * | 5/1996 | |
| WO | WO 96/24092 A2 * | 8/1996 | |
| WO | WO 96/27155 A2 * | 9/1996 | |
| WO | WO 97/25798 A1 * | 7/1997 | |
| WO | WO 97/43761 A2 * | 11/1997 | |
| WO | WO 98/09209 A1 * | 3/1998 | |
| WO | WO 98/10381 A1 | 3/1998 | |
| WO | WO 98/21679 A1 | 5/1998 | |
| WO | WO 98/24037 A2 | 6/1998 | |
| WO | WO 98/37481 A1 | 8/1998 | |
| WO | WO 00/15221 A1 | 3/2000 | |
| WO | WO 00/59150 A2 | 10/2000 | |
| WO | WO 00/58811 A3 | 9/2002 | |
| WO | WO 2004/019182 A2 | 3/2004 | |
| WO | WO 2004/092933 A1 | 10/2004 | |
| WO | 2006085103 A1 | 8/2006 | |
| WO | WO 20060195906 A1 | 8/2006 | |

OTHER PUBLICATIONS

In the United States Patent and Trademark Office, Final Office Action, In re:. U.S. Appl. No. 11/273,775, filed Nov. 14, 2005, Dated Nov. 28, 2007, 14 pages.
Main, A. et al., "Software Protection and Application Security: Understanding the Battleground", State of the Art and Evolution of Computer Security and Industrial Cryptography, Jun. 2003, 19 pages, http://www.scs.carleton.ca.
In the United States Patent and Trademark Office, Notice of Allowance and Fee(s) Due, In re:. U.S. Appl. No. 11/404,448, filed Apr. 14, 2006, Dated Mar. 20, 2008, 13 pages.
In the United States Patent and Trademark Office, Non-Final Office Action, In re:. U.S. Appl. No. 11/404,448, filed Apr. 14, 2006, Dated Sep. 21, 2007, 13 pages.
In the United States Patent and Trademark Office, Final Office Action, In re:. U.S. Appl. No. 10/681,017, filed Oct. 8, 2003 Dated Nov. 26, 2007, 13 pages.
In the United States Patent and Trademark Office, Non-Final Office Action, In re:. U.S. Appl. No. 10/681,017, filed Oct. 8, 2003 Dated May 30, 2007, 13 pages.
Tulloch, M., "Windows 2000 Administration in a Nutshell", Feb. 16, 2001, O'Reilly Media, 4 pages.
Using USB Flash Drives at SUNY/Cortland Instructions for Windows XP/2000, Dec. 12, 2004, Academic Computing Liaisons, 8 pages.
In the United States Patent and Trademark Office, Non-Final Office Action in related U.S. Appl. No. 11/095,297, filed Mar. 30, 2005, Dated Nov. 6, 2008, 16 pages.
Cappaert, J. et al., "Self-Encrypting Code to Protect Against Analysis and Tampering," in First Benelux Workshop on Information and System Security, Nov. 8-9, 2006, see http://www.cosic.esat.kuleuven.be/wissec2006/papers/3.pdf, 14 pages.
Griffiths, A.L., 2005. Binary protection schemes. RECON2005 Conference, Jun. 2005., 91 pages.
In the United States Patent and Trademark Office, Advisory Action, In re:. U.S. Appl. No. 11/273,775, filed Nov. 14, 2005, Dated Sep. 24, 2008, 2 pages.
In the United States Patent and Trademark Office, Final Office Action, In re:. U.S. Appl. No. 11/273,775, filed Nov. 14, 2005, Dated Jun. 19, 2008, 14 pages.

In the United States Patent and Trademark Office, Final Office Action, In re:. U.S. Appl. No. 11/273,775, filed Nov. 14, 2005, Dated Nov. 10, 2009, 19 pages.
In the United States Patent and Trademark Office, Non-Final Office Action, In re:. U.S. Appl. No. 11/273,775, filed Nov. 14, 2005, Dated Jan. 15, 2009, 18 pages.
In the United States Patent and Trademark Office, Non-Final Office Action, In re:. U.S. Appl. No. 11/273,775, filed Nov. 14, 2005, Dated Nov. 28, 2007, 13 pages.
In the United States Patent and Trademark Office, Notice of Allowance and Fee(s) Due, In re:. U.S. Appl. No. 10/681,017, filed Oct. 8, 2003 Dated Jun. 25, 2008, 9 pages.
"Aladdin Knowledge Systems Partners with Rights Exchange, Inc. to Develop a Comprehensive Solution for Electronic Software Distribution", Aug. 3, 1998, 5 pages.
"Black Box Crypton Defies the Hackers", Electronics Weekly, Mar. 6, 1985, p. 26.
"IBM Spearheading Intellectual Property Protection Technology for Information on the Internet", May 1996, 3 pages.
"LicensIt: kinder,gentler copyright? Copyright management system links content, authorship information", Seybold Report on Desktop Publishing, 1996, 10(11), 2 pages.
"portion", Collins English Dictionary, London: Collins, 2000, Credo Reference [online], www.credoreference.com-entry-hcengdict-portion, retrieved Jun. 6, 2009.
"Rights Management in the Digital Age: Trading in Bits, Not Atoms", Spring, 1997, 4, 3 pages.
"Solution for piracy", Which Computer, 1983, p. 29 (from DialogClassic WebTM file 275, Accession No. 01 0 14280).
"Aladdin Acquires the Assets of Micro Macro Technologies", Business Wire, Mar. 3, 1999, 2 pages.
"All About Activation of Adobe Software", www.adobe.com-activation-main.html, accessed Jun. 24, 2004, 5 pages.
"BreakerTech Joins Copyright Management Market", Computergram International, Aug. 5, 1999, 2 pages.
"Optimising License Checkouts from a Floating License Server", Arm the architecture for the digital, accessed www.arm.com-supportlfaqdev-1391.html.
"Sony Develops Copyright Protection Solutions for Digital Music Content", PR Newswire ,Feb. 25, 1999, 4 pages.
"Technological Solutions Rise to Complement Law's Small Stick Guarding Electronic Works", Information Law Alert, Jun. 16, 1995, 3-4 and 7.
Armati, "Tools and standards for protection, control and presentation of data", Apr. 3, 1996, 17 pages.
Benjamin et al., "Electronic markets and virtual value chains on the information superhighway", Sloan Management Rev., Winter, 1995, 62-72.
Cassidy, "A Web developers guide to content encapsulation technology", Apr. 1997, 5 pages.
Cox, "Superdistribution", Idees Fortes, Sep. 1994, 2 pages.
Cox, "What if There Is A Silver Bullet", J. Object Oriented Programm, Jun. 1992, 8-9 and 76.
Gold, "Finland—Data Fellows Secures ICSA Certification", Newsbytes, Jan. 7, 1998, 1 page.
Griswold, "A Method for Protecting Copyright on Networks", IMA Intel. Property Project Proceedings, Jan. 1994, 1(1), 169-178.
Hauser, "Does Licensing Require New Access Control Techniques?", Conference on Computer and Communications Security, Aug. 3, 1993, 9 pages.
Hudgins-Bonafield, "Selling Knowledge on the Net", Network Computing, Jun. 1, 1995, 102-109.
Kahn, "Deposit, Registration and Recordation in an electronic copyright management system", IM Intellectual Property Project Proceedings, 1994, 1(1), 111-120.
Kaplan, "IBM Cryptolopes_, Super-Distribution and Digital Rights Management", Dec. 1996, 7 pages.
Kent, "Protecting externally supplied software in small computers", Sep. 1980, 1-42 and 250-252.
Kohl et al., "Safeguarding Digital Library Contents and Users; Protecting Documents Rather Than Channels", D-Lib Magazine, Sep. 1997, 9 pages.

Linn, "Copyright and Information Services in the Context of the National Research and Education Network", IMA Intell. Property Project Proceedings, Jan. 1994, 1(1), 1 and 10-20.

McNab, "Super-Distribution works better in practical applications", Mar. 2, 1998, 2 pages.

Microsoft Partner Program, "Product Activation", www.members.microsoft.com-partner-salesmarket-pack-activatin.aspx, accessed Jun. 24, 2004, 4 pages.

Moeller, "IBM takes charge of E-commerce; Plans client, server apps based on SET", Apr. 1996, 4 pages.

Moeller, "NetTrust lets Cyberspace Merchants Take Account", PC Week, Nov. 20, 1995, 12(48), 1 page.

Olson et al., "Concurrent Access Licensing", Software Licensing, 1988, 6(9), 67-72.

Pemberton, "An Online Interview with Jeff Crigler at IBM InfoMarket", Jul. 1996, 7 pages.

Ramanujapuram et al., "Digital Content & Intellectual Property Rights: A specficiation language and tools for rights management", Dec. 1998, 20-23 and 26.

Sibert et al., "Securing the Content, Not the Wire, for Information Commerce", Jul. 1995, 1-11.

Sibert et al., "The DigiBox: A Self-protecting Container for Information Commerce", First USENIX Workshop on Electronic Commerce, Jul. 11-12, 1995, 171-183.

Stefik, "Shifting the Possible: How Trusted Systems and Digital Property Rights Challenge Us to Rethink Digital Publishing", Technical Perspective, 1997, 137-159.

Stefik, "Trusted Systems", Mar. 1997, 8 pages.

St-Michel et al., "Autoplay in Windows XP: Automatically Detect and React to New Devices on a System", MSDN Magazine, Nov. 2001, 16(11), 12 pages.

Sun Microsystems, User's Guide Wireless Toolkit, Version 2.1, Java Platform Micro Edition, Dec. 2003, 1-89.

Thompson, "Digital Licensing", Architectural Perspectives, IEEE Computer Society, Jul.-Aug. 2005, 9(4), 4 pages.

Weber, "Digital Rights Management Technology", Oct. 1995, 1-49.

White et al., "Abyss: A trusted architecture for software protection", IEEE Symposium on Security and Privacy, Apr. 27-29, 1987, 38-51.

White et al., "Abyss: An Architecture for Software Protection", IEEE Trans. On Software Engineering, Jun. 1990, 16(6), 619-629.

Zhang et al., "Hiding Program Slices for Software Security", Proceedings of the International Symposium on Code Generation and Optimization: Feedback-Directed and Runtime Optimization, 2003, 325-336.

\* cited by examiner

FIRST COMPUTER PROCESS AND SECOND COMPUTER PROCESS PROXY-EXECUTING CODE FROM THIRD COMPUTER PROCESS ON BEHALF OF FIRST PROCESS

CROSS-REFERENCE TO RELATED APPLICATION

The present application is a continuation-in-part of prior application Ser. No. 10/681,017, filed Oct. 8, 2003 and hereby incorporated by reference in its entirety.

TECHNICAL FIELD

This invention relates to a first process on a computer and a second process on the computer that executes code on behalf of and as a proxy for such first process. More particularly, the invention relates to a security process on the computer that proxy-executes the code on behalf of an application process only if the security process is satisfied based on a license or the like that the application process is entitled to be operating on the computer.

BACKGROUND OF THE INVENTION

A computer application distributor wishes to distribute such computer application to each of many users or recipients in exchange for a license fee or some other consideration. However, such distributor typically also wishes to restrict what each user or recipient can do with such distributed computer application. For example, the distributor would like to restrict the user from copying and re-distributing such application to a second user, at least in a manner that denies the distributor a license fee from such second user.

In addition, the distributor may wish to provide the user with the flexibility to purchase different types of use licenses at different license fees, while at the same time holding the user to the terms of whatever type of license is in fact purchased. For example, the distributor may wish to allow the application to be executed only a limited number of times, only for a certain total time, only on a certain type of machine, only on a certain type of rendering platform, only by a certain type of user, etc. Likewise, the distributor may wish to allow one user to pay a smaller license fee and access a smaller set of application functions and also to allow another user to pay a larger license fee and access a larger set of application functions, and the like.

However, after distribution has occurred, such distributor has very little if any control over the distributed application. This is especially problematic in view of the fact that the application may be copied and re-distributed to most any personal computer, presuming that the application is not otherwise protected in some manner from such copying and re-distribution. As should be appreciated, most any such personal computer includes the software and hardware necessary to make an exact digital copy of such application, and to download such exact digital copy to a write-able magnetic or optical disk, or to send such exact digital copy over a network such as the Internet to any destination.

Of course, as part of a transaction wherein the application is distributed, the distributor may require the user/recipient of the application to promise not to re-distribute such application in an unwelcome manner. However, such a promise is easily made and easily broken. A distributor may therefore attempt to prevent such re-distribution through any of several known security measures.

One such security measure is product activation. In such product activation, a customer acquiring a software application is provided with a product activation key corresponding thereto, which is a unique serial number and product identifier that acts as a proof of purchase or the like. The provided product key is then entered during installation of the application on a particular computer device to act as a proffer that the application was acquired legally and/or otherwise properly. The product activation key need not be and typically is not cryptographic in nature, although a digital signature (which is cryptographic in nature) may be included to act as a guarantee that the product key is genuine.

The entered product key and an ID representative of the computer device are then sent to a product activation service as part of the installation process. As may be appreciated, the product activation service determines whether the entered product key is valid, whether the product key has been employed before, and if so in connection with what computer device. Typically, each product key enables an installation or re-installation of the application on a single computing device, as is set forth in a corresponding license agreement, although a product key may also enable a set number of installations/re-installations on multiple computer devices also.

Accordingly, if the product activation service determines that the entered product key has already been employed to install the application on another computer device (or has been employed a maximum number of times, for example), such activation service will not allow the installation of the application on the computer device to proceed, will not allow a complete installation of the application on the computer device, will not allow the installed application to be used on the computer device, or the like, as the case maybe. Thus, activation as used herein may entail permission to install the application, permission to perform some level of installation of the application, permission to completely install the application, some level of permission to use the application, complete permission to use the application, or the like.

If the activation service declines to activate the application for the customer based on an entered product key already being used in connection with another computing device, or based on the entered product key not supporting the level of activation desired, the customer must acquire another appropriate product key to install/completely install/use the application on the computing device in the manner desired. Thus, the product key and the product activation service act to ensure that the application is not nefariously or wantonly installed/activated/used on multiple computing devices, such as may be in violation of any software license agreement associated with the software product.

Note that as part of the activation process, the activation service may return a digital version of the license to the computing device on which the application is associated. Such license may be tied to the computing device such that the license is not usable with any other computing device, and may express a level of activation, as well as license terms such as application functions that are to be made available, functions that are to be made non-available, a period of activation or a number of times the application may be executed on the computing device, and the like. In general, such license may express any limitations and/or rights and also may express any policies that should be honored in connection with the execution of the application on the computing device, all as set forth by the distributor of the application or another entity.

With such license, then, a rights client controller with a license evaluator or the like may be employed on the computer along with the distributed application to control operation and use of the application based on an evaluation of whether the license so permits. However, a need exists for an actual method and mechanism by which such rights client with such license evaluator may in fact control operation and use of the application based on the license. In particular, a need exists for such a rights client with such a license evaluator that executes certain portions of code on behalf of and as a proxy for the application, but only if the license evaluator determines that the license allows such execution.

While in one case the portions of code are associated with the application, it is to be appreciated that in another case the portions of code are associated with another entity, such as another application or executable. Thus, the (first) application cannot be run outside of the presence of the (second) application or executable. Accordingly, a need exists for such a rights client with such a license evaluator that executes certain portions of code associated with the second application on behalf of the first application and as a proxy for such first application, but only if the license evaluator determines that the license allows such execution.

SUMMARY OF THE INVENTION

The aforementioned needs are satisfied at least in part by the present invention in which a computer has a first process with code to be executed in connection therewith, where the code includes at least one triggering device, and a digital license corresponding to the first process, where the license sets forth terms and conditions for operating the first process. A second process operating on the computer proxy-executes code corresponding to each triggering device of the first process on behalf of such first process. The second process includes a license evaluator for evaluating the license to determine whether the first process is to be operated in accordance with the terms and conditions set forth in such license, and the second process chooses whether to in fact proxy-execute the code corresponding to each triggering device of the first process on behalf of such first process based at least in part on whether the license evaluator has determined that the first process is to be operated in accordance with the terms and conditions of the license.

A third process includes the code corresponding to each triggering device of the first process and an address of the triggering device in the first process. Thus, the first process is dependent on and cannot be operated without the second process and the third process.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
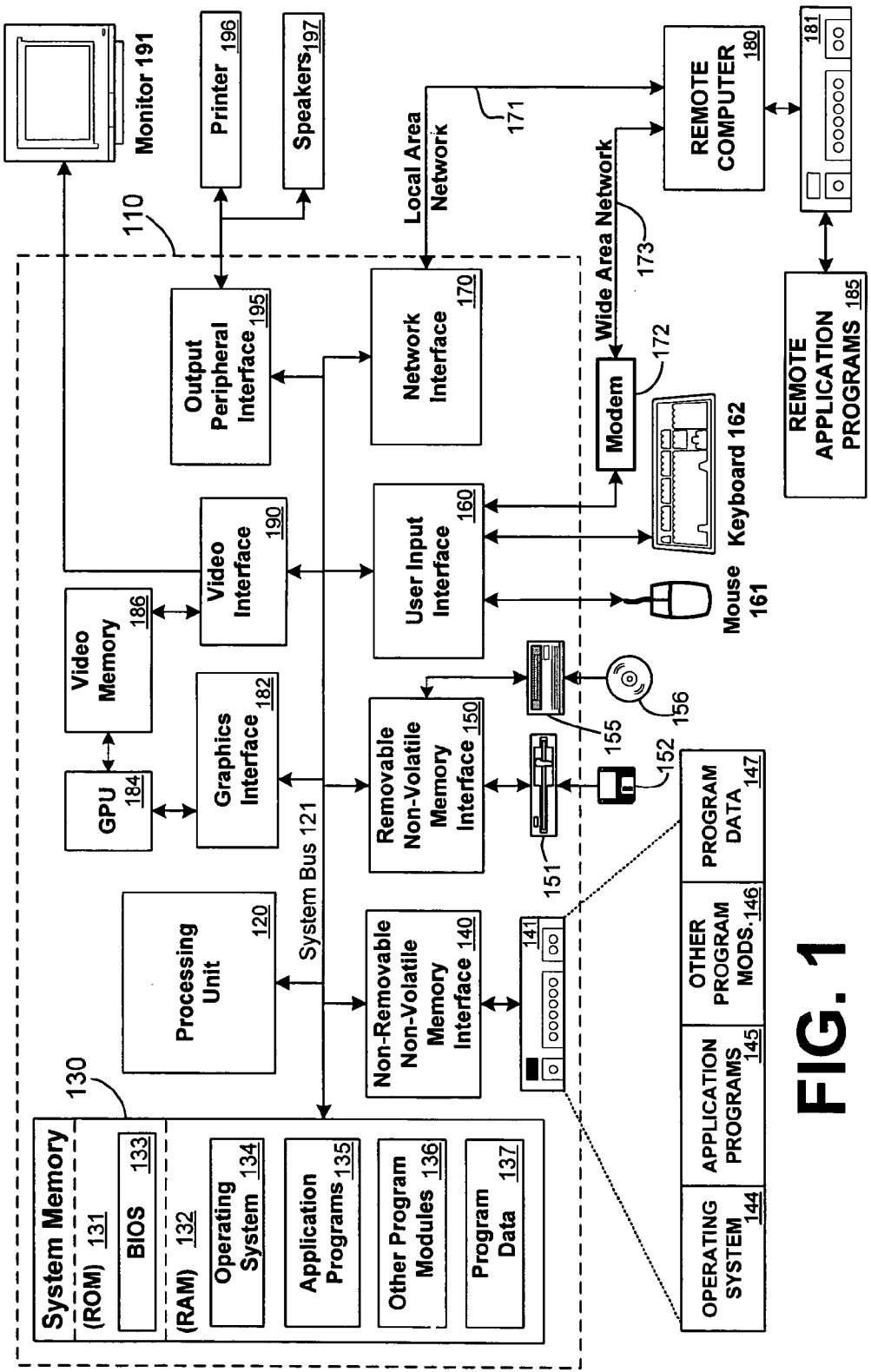
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
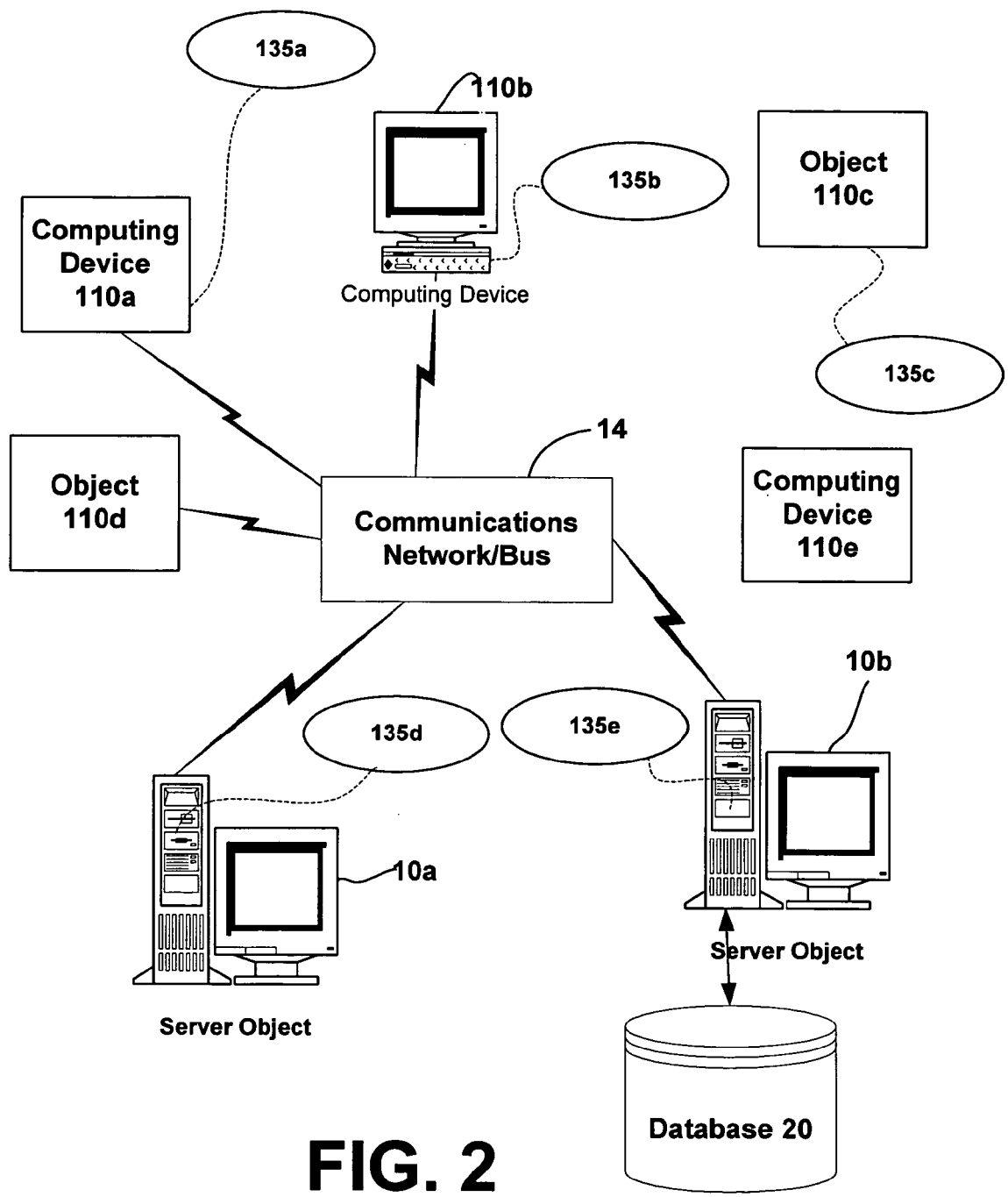
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Proxy Execution of Code

In the present invention, a rights client with a license evaluator and in connection with a product activation service controls operation and use of an application based on a corresponding license by executing code on behalf of and as a proxy for an application, but only if the license evaluator determines that the license allows such execution. Thus, the rights client with the license evaluator enforces the license as against a user of the application.

As may be appreciated, although the present invention is disclosed primarily in terms of the rights client with the license evaluator, the application, the license, and the product activation service, such present invention may also be employed in connection with alternate elements without departing from the spirit and scope of the present invention. For example, the application may instead be any application or type of process running on a computer, including a program, an operating system, and the like, or even a piece of digital content such as an audio recording or multimedia presentation. Similarly, the license may instead be any sort of permission token, with or without specific permission parameters, and the license evaluator may instead be any kind of device for evaluating such a permission token. Likewise, the product activation service may instead be any variety of permission-granting authority, and the rights client may instead be any variety of controlling authority that can also proxy-execute code. Accordingly, and more generally, in the present invention, a second process on a computer controls the operation and use of a first process on a computer by executing code on behalf of and as a proxy for the first process.

Figure 3:
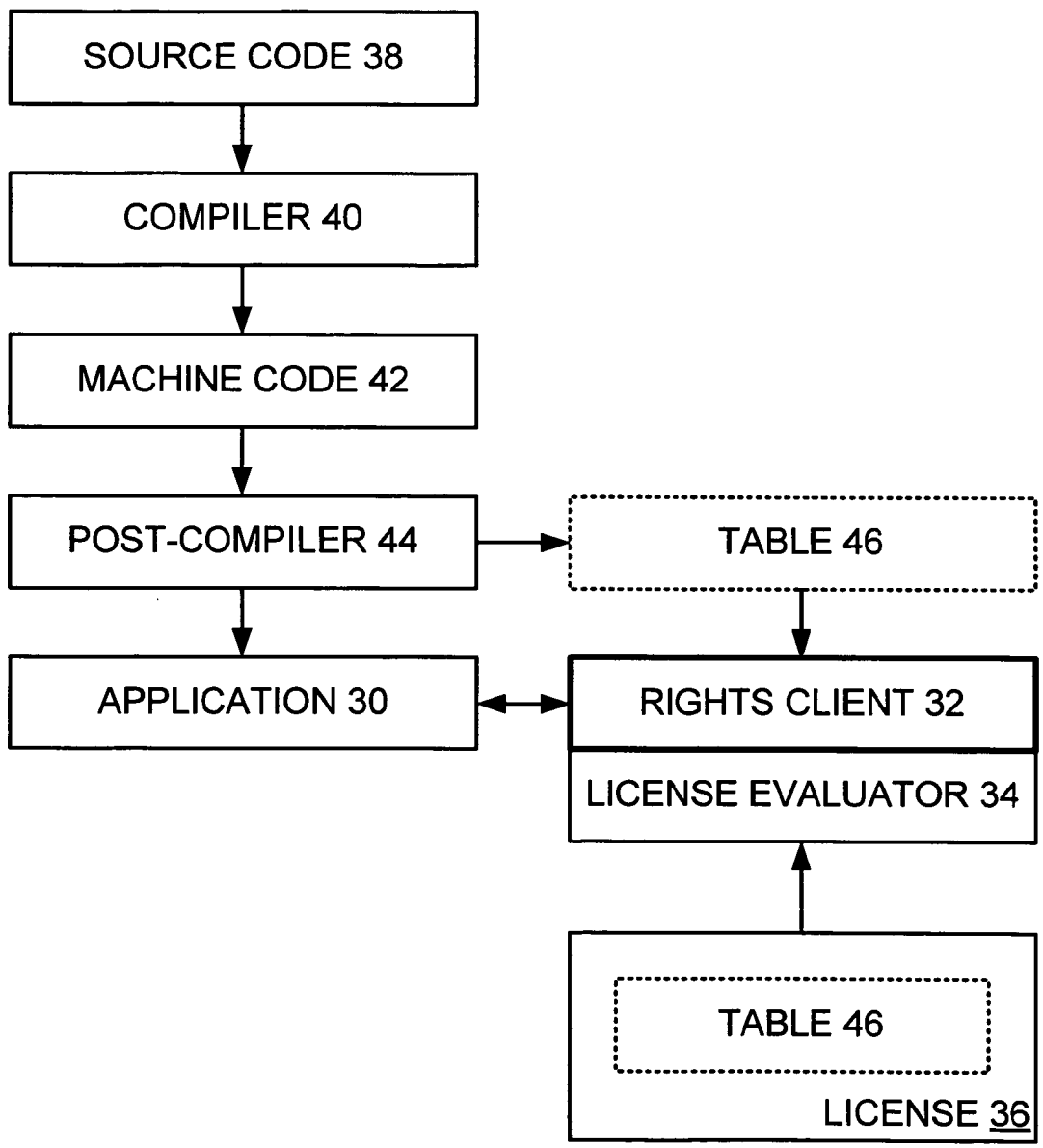
FIG. 3 is a block diagram showing a first computer process, a second computer process proxy-executing code on behalf of the computer process, and related elements in accordance with one embodiment of the present invention.

Turning now to FIG. 3, it is seen that in one embodiment of the present invention, a first process such as an application 30 is dependent upon a second process such as a rights client 32 to proxy execute at least some portion of code for the application 30, where the rights client 32 includes a license evaluator 34 or the like. Accordingly, the rights client 32 may choose whether to in fact proxy execute the code for the application 30 based, among other things, on whether the license evaluator 34 has access to a license 36 corresponding to the application 30, and on whether the license 36 has permissions or rights that allow or at least do not prohibit the action corresponding to the code to be executed. Note that such a license 36 and the license evaluation 34 of the rights client 32 are known or should be apparent to the relevant public and therefore need not be disclosed herein in any detail.

Figure 4:
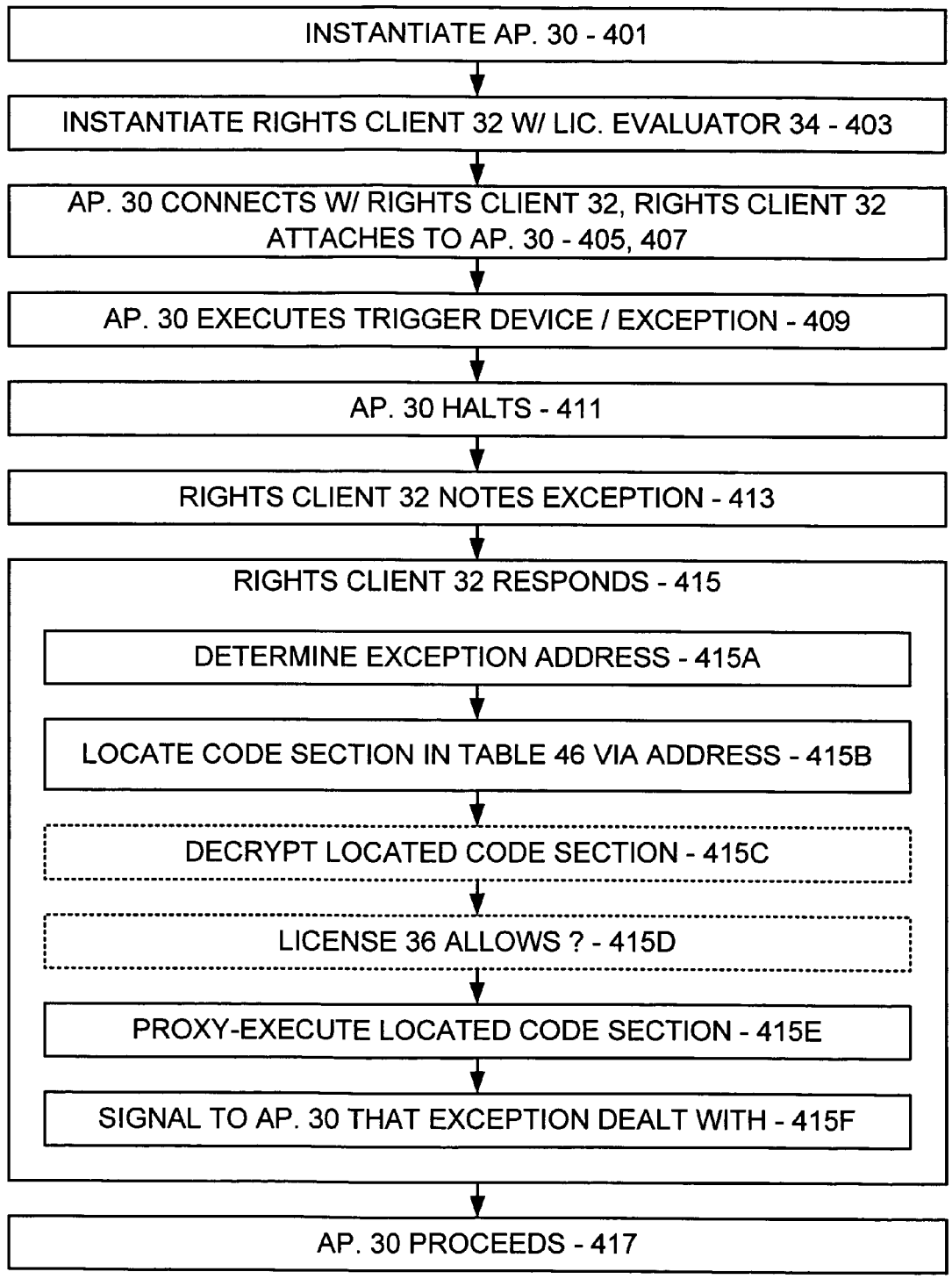
FIG. 4 is a flow diagram showing key steps performed in connection with the first and second processes of FIG. 3 to proxy-execute code in accordance with one embodiment of the present invention.

In one embodiment of the present invention, and referring now to FIG. 4, the application 30, rights client 32, and license evaluator 34 are constructed to operate on a computer 110 (FIG. 1) or the like as follows. Typically, either a user or another process on the computer 110 instantiates the application 30 on such computer 110 as the aforementioned first process (step 401), and as part of an initializing process such application 30 ensures that the rights client 32 with the license evaluator 34 (hereinafter, 'rights client 32') is instantiated on the computer 110 as the aforementioned second process (step 403). Thereafter, the application 30 establishes a connection with the rights client 32 (step 405). Note that it may be the case that the rights client 32 is already instantiated or it may be the case the rights client 32 must be newly instantiated, either by the application 30, another process, the user, or the like.

Once step 405 is performed, and presuming that a license 36 corresponding to the application 30 is available to the rights client 32 and the license evaluator 34 thereof, the application 30 can query the rights client 32 to have the license evaluator 34 thereof determine based on the license 36 the rights the application 30 has based on such license 36, and the application 30 can then operate based on such rights. However, it is to be appreciated that a nefarious entity wishing to subvert the license 36 might choose to attack the application 30 by re-directing the query to a stub rights client that would in effect grant all rights to the application 30 without regard to any license 36, present or otherwise. Alternatively, such a nefarious entity might choose to spoof communications between the application 30 and the rights client 32 or may wish to attack the rights client 32 itself if the application 30 cannot be attacked. Note, though, that the latter case is less likely inasmuch as the rights client 32 should be highly secure and protected from such an attack.

Accordingly, and in one embodiment of the present invention, the rights client 32 is required to proxy-execute at least some portions of code on behalf of the application 30 so that the application is dependent on the rights client 32. Put another way, by requiring the rights client 32 to proxy-execute at least some portion of code on behalf of the application 30, the aforementioned nefarious entity cannot subvert the license 36 by somehow removing the rights client 32 from participating in the method of FIG. 4. Instead, the rights client 32 must participate to proxy-execute code on behalf of the application 30, and while doing so the license evaluator 34 of the rights client 32 can also perform evaluation functions with regard to the license 36. Thus the rights client 32 does not merely provide the application 30 with a true or false type of response that could be spoofed.

In one embodiment of the present invention, the license 36 includes encoded information regarding the code that the rights client 32 is to proxy-execute. Thus, the license 36 must be available to the rights client 32 for same to proxy-execute on behalf of the application 30. For example, the encoded information may include the code, a reference to a location of the code, a decryption key for decrypting an encrypted version of the code, or the like.

Figure 5:
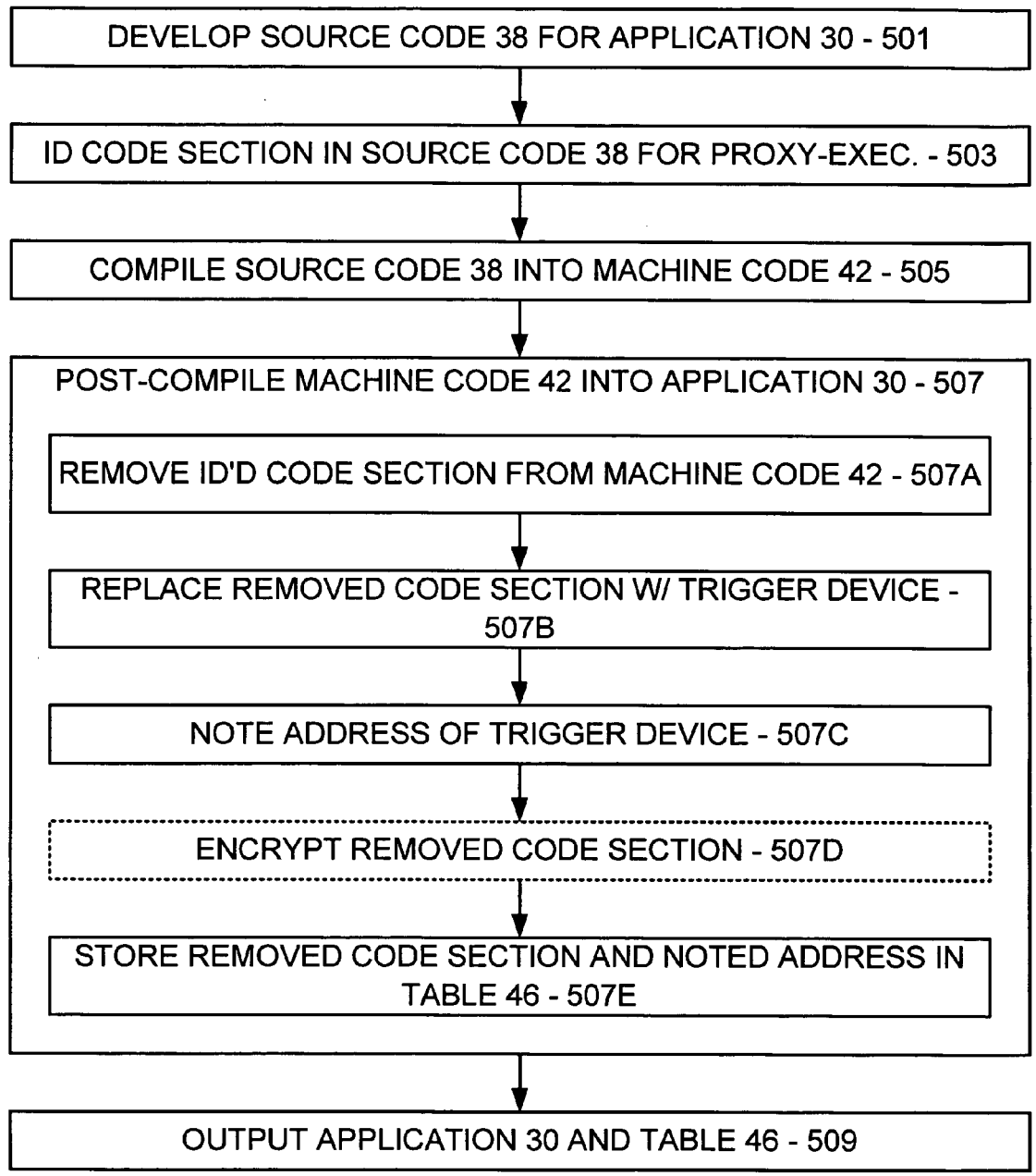
FIG. 5 is a flow diagram showing key steps performed to develop the first process of FIG. 3 in accordance with one embodiment of the present invention.

As should now be appreciated, in order to effectuate proxy-execution, the application 30 must be pre-processed to define the code that is to be proxy-executed, to remove same from such application 30, and to appropriately store such removed code in a form proxy-executable by the rights client 32. In one embodiment of the present invention, then, and turning now to FIG. 5, a method of pre-processing the application 30 to effectuate proxy-execution is shown.

Preliminarily, and as may be appreciated, a developer develops source code 38 (FIG. 3) for the application 30 in an appropriate programming language, such as for example a C-type programming language (step 501). In doing so, and significantly, the developer identifies within such source code 38 for the application 30 each of one or more code sections that is to be proxy-executed (step 503). As may be appreciated, each such proxy-executed code section identification may comprise any appropriate mark, tag, command, or the like without departing from the spirit and scope of the present invention. Thereafter, the developer compiles the source code 38 with a compiler 40 into machine code 42 (step 505).

Note that the developer may identify each code section within the source code 38 based on any particular criteria without departing from the spirit and scope of the present invention. For example, if the developer merely wishes to trigger proxy-execution from time to time so as to ensure the rights client 32 is present and is allowing the application 30 to operate based on a corresponding license 36, each such identified code section may be decided upon in a fairly random manner. However, if the developer wishes to trigger proxy-execution at specific times and/or with regard to specific sections of code, each such identified code section must be decided upon in a more targeted manner. Note with regard to the latter that it may be the case that an identified code section specifies a particular license right. In such a situation, it may also be the case that the rights client 32 will proxy-execute such identified code section only if the specified license right in the license 36 is met.

As may be appreciated, the compiler 40 may be any appropriate compiler without departing from the spirit and scope of the present invention. Significantly, the compiler 40 is constructed to maintain each code section identification in the machine code 42 so that post-compile processing may be performed on the code section identified thereby. Such maintaining may be performed in any appropriate manner without departing from the spirit and scope of the present invention. For example, the compiler 40 may pass the identification from the source code 38 to the machine code 42 in a recognizable form, or may create a scratch table (not shown) with such information therein.

Thus, and in one embodiment of the present invention, after such compiling, the developer post-compiles the machine code 42 with each recognizable code section identification therein with a post-compiler 44 into the final code representative of the application 30, where the post-compiler 44 converts each identified code section into a form accessible only by the rights client 32 and not by the application 30, such as for example by removing each identified code section in the machine code 42 from such application 30 or otherwise makes such identified code section inaccessible (step 507). As may be appreciated, such post-compiler 44 is constructed to retrieve each code section identification, either from the machine code 42, the aforementioned scratch table, or elsewhere, and operate based thereon.

In one embodiment of the present invention, for each identified code section in the machine code 42, the post-compiler 44 removes the identified code section from the machine code 42 (step 507a), replaces the removed code section with a triggering device (step 507b), notes an address of the triggering device within the application 30 (step 507c), and stores the removed code section and the noted address in a table 46 (FIG. 3) or the like (step 507e). If necessary or advisable, each removed code section may be stored in the table 46 in an encrypted form decryptable by the rights client 32 (step 507d). As was set forth above, such table 46 may be made available to the rights client 32 by being set forth in the license 36, or by being set forth in another location. Note that the table 46 may be signed or otherwise protected from alteration by a verifying device such as a hash.

As may be appreciated, by replacing the removed code section with the triggering device, and presuming that the triggering device is shorter than the removed code section, the post-compiler 44 shortens the machine code 42. Note that the triggering device may be any appropriate triggering device without departing from the spirit and scope of the present invention, as long as the triggering device is recognizable as a signal that the rights client 32 is needed to proxy-execute the corresponding removed code section. For example the triggering device may be a particular exception that would get the attention of the rights client 32.

After the post-compiler 44 is finished, and as should now be appreciated, such post-compiler 44 outputs final code representative of the application 30 (hereinafter, 'the application 30') and the table 46 (step 509). As was set forth above, such table 46 may be made available to the rights client 32 by being set forth in the license 36, or by being set forth in another location separate from the application 30. It may for example be the case that the table 46 with encrypted removed code sections therein is placed in the license 36 along with a decryption key for decrypting each encrypted code section, where the decryption key is itself encrypted in a manner decryptable by the rights client 32. Note that by separating the table 46 from the application 30, the application 30 has no innate access to the table 46 or the removed code sections therein.

Thus, and returning now to FIG. 4, during runtime, and after the application 30 and rights client 32 have been instantiated, the rights client 32 attaches itself to the application 30 in the manner of a debugger or the like so that the rights client 32 can monitor the application 30 for when each triggering device/exception therein is executed (step 407). As may be appreciated, the rights client 32 monitors the application 30 for the particular triggering device/exception (hereinafter, 'exception') that signals that the rights client 32 is to proxy-execute on behalf of the application 30. Thus, on every breakpoint exception, the rights client 32 determines whether the exception source is a removed code section, and if so the rights client 32 proxy-executes the removed code section, presuming the license 36 so allows.

In an alternate embodiment of the present invention, the rights client 32 does not attach itself to the application 30 to monitor for an exception, but instead receives the exception from an operating system operating the computer 110. However, such an arrangement is indirect and therefore slower. Another alternative would be to have each triggering device be a call to the rights client 32, although such a strategy is slightly more complex as compared to an exception and is more prone to attack by a nefarious entity.

At some point, the application 30 may explicitly request permission to operate from the rights client 32 based on the license 36. In response, the rights client 32 searches for the license 36, the license evaluator 34 evaluates such license 36, and the rights client 32 returns such requested permission if the evaluation of the license evaluator 34 is positive. Note, though, that such explicit request for permission and response are ancillary to the present invention. Rather, in the present invention, the rights client 32 is actuated based on an exception or the like from the application 30 and not based on an explicit request from the application 30. Thus, in the present invention, the rights client 32 can withhold performance of a function on behalf of the application 30 even when the application 30 never requested permission to perform such function.

At any rate, in the course of operating, the application 30 at some point executes an exception in the code thereof, where such exception was placed in the application 30 by the post-compiler 44 in place of a removed identified code portion (step 409). As should be understood, upon executing the exception, the application 30 halts until receiving notice that the exception has been dealt with (step 411). Inasmuch as the rights client 32 is attached to the operating application 30 and is listening for such exception from such application 30, such rights client 32 notes the exception (step 413) and responds thereto (step 415).

In particular, to respond to the exception, the rights client first determines the address of the exception within the application 30 (step 415a), locates the corresponding code section in the table 46 based on such address (step 415b), proxy-executes such corresponding code section on behalf of the application 30 (step 415e), and then signals to the application 30 that the exception has been dealt with (step 415f). As may be appreciated, the application 30 may then proceed (step 417). Note that if the corresponding code section is encrypted, the rights client 32 must decrypt the located corresponding code section before proxy-executing same (step 415c). Note, too, that a particular code section may require that the license evaluator 34 of the rights client 32 first verify that the license 36 grants the rights necessary to proxy-execute such code section on behalf of the application 30 (step 415d). As may be appreciated, the rights client 32 proxy-executes such code section only if the license grants the right to do so. Otherwise, the rights client 32 declines to do so. In the latter case, it may be that the rights client 32 returns an appropriate message to the application 30.

It is to be appreciated that a rights client 32 should not be proxy-executing any arbitrary code section, especially inasmuch as the rights client 32 should be especially secure and therefore could have a relatively large amount of operating rights with respect to the computer 110. Put another way, the rights client 32 should not be performing actions that the application 30 would not have operating rights to perform, such as altering certain system registers, accessing memory areas of other applications and the operating system, and the like. Accordingly, in one embodiment of the present invention, the post-compiler 44 during operation thereof ensures that each code section removed and stored thereby is not of a sensitive nature. For example, it may be the case that the post-compiler 44 during operation thereof ensures that each such code section does not affect system memory. Of course, other bases for filtering code sections may be employed without departing from the spirit and scope of the present invention. Note that if a code section includes sensitive code, it may be that the post-compiler isolates such sensitive code and removes only sub-portions of code on either side of the sensitive code.

In one embodiment of the present invention, the rights client 32 proxy-executes on behalf of the application only if a valid license 36 corresponding to such application 30 is available to the rights client 32. In such a case, it may be that the purpose of each exception and proxy-execution based thereon is merely to occasionally check that the license 36 is still present and still valid. In an alternate embodiment, the rights client 32 proxy-executes on behalf of the application without regard to any corresponding valid license 36. In such a case, it may be that the purpose of each exception and proxy-execution based thereon is merely to tie the application 30 to the rights client 32, which presumably is tied to the computer 110, thus tying the application 30 to the computer 110.

In one embodiment of the present invention, the application 30 as produced by the post-compiler 44 may include multiple types of exceptions, each triggering the rights client 32. However, each different type of exception is handled differently. For one example, one type of exception may require the rights client 32 to check the license 36 while another type may not. For another example, different types of exceptions could require access to different tables 46, or could require different decryption keys and/or methods.

As disclosed herein, the application 30, the rights client 32, and the license 36 are separate constructs. Nevertheless, it should be appreciated that such items may be combined in any manner without departing from the spirit and scope of the present invention. For example, the application 30 could include the rights client 32, or the rights client 32 could include the license 36. Note, though, that in at least some instances combined items may be more susceptible to an attack from a nefarious entity.

As also disclosed herein, the rights client 32 proxy-executes code on behalf of the application 30. Alternatively, the rights client 32 may operate to modify the application 30 to include the to-be-executed code, allow such application 30 to execute such code, and then again modify the application 30 to remove such code. Note, though, that such an arrangement may be more susceptible to attack by a nefarious entity, especially in the moments when the application 30 is modified to include the to-be-executed code.

As may be appreciated, one especially useful aspect of the present invention is that the rights client 32 may now perform especially secure functions on behalf of the application 30 such that a nefarious entity is thwarted from affecting such functions. For example, it may be the case that a term in a license 36 affects how many times the application 30 can perform a specific action. Although the application 30 could obtain such term from such license 36, having the application 30 do so could allow a nefarious entity to intervene in the process to subvert same. Instead, in one embodiment of the present invention, the rights client 32 is employed to proxy-execute code for the application 30 relating to such term in such license 36, including obtaining the term and employing same.

Proxy Execution of Code as Obtained from Provider and on Behalf of Consumer

As was set forth above, a rights client 32 with a license evaluator 34 controls operation and use of an application 30 based on a corresponding license 36 by executing code on behalf of and as a proxy for the application 30, but only if the license evaluator 34 determines that the license 36 allows such execution. Thus, and again, the rights client 32 with the license evaluator 34 enforces the license 36 as against a user of the application 30. As was set forth above, the code to be executed may be embodied within a table 46 that may be made available to the rights client 32 by being set forth in the license 36, or by being set forth in another location separate from the application 30.

Figure 6:
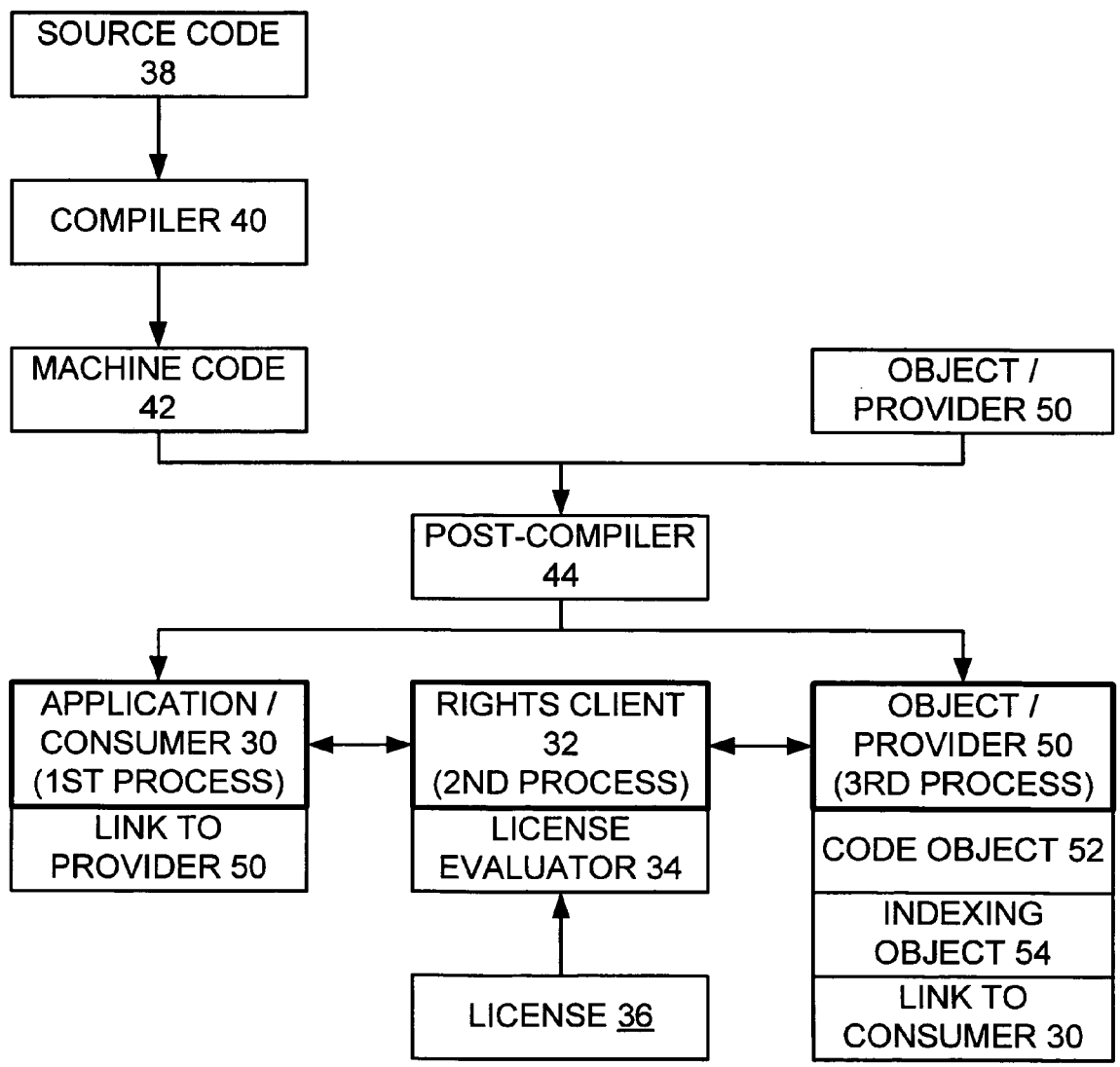
FIG. 6 is a block diagram showing a first computer process, a second computer process proxy-executing code on behalf of the computer process, a third computer process supplying the proxy-executed code, and related elements in accordance with another embodiment of the present invention.

Significantly, and in one embodiment of the present invention, and turning now to FIG. 6, rather than being set forth in the license 36, the code to be executed is associated with another object 50, such as for example another application, an executable, a process, a data library, a data file, or the like. Thus, and also significantly, the object 50 acts as a provider 50 of the code, and the application 30 acts as a consumer 30 of the code, as shown in FIG. 6. As a result, the consumer 30 cannot be operated without the presence of the provider 50, and the consumer 30 is thus dependent on the provider 50. Presuming that the provider 50 operates as part of a particular process on a computer, then, it is to be appreciated that in the present invention, the aforementioned second process on the computer (i.e., the rights client 32) controls the operation and use of the aforementioned first process on the computer (i.e., the consumer 30) by executing code from a third process on the computer (i.e., the provider 50) on behalf of and as a proxy for the first process/consumer 30.

As may be appreciate, such an arrangement may be desirable for example in an instance where a distributor or owner of the provider of the consumer 30 wishes to ensure that such consumer 30 is operated only in conjunction with the provider 50, and not in conjunction with other similar objects. For example, a distributor of a codec for decrypting encrypted content may wish to ensure that the codec is only operated in conjunction with a particular media player. In such an instance, the codec would act as the consumer 30 and the media player would act as the provider 50, and appropriate portions of the code from the codec/consumer 30 would be associated with the media player/provider 50. As may now be appreciated, the provider 50 likely has other code that is to be executed apart from the code that is to be executed on behalf of the consumer 30.

Referring still to FIG. 6, it is to be appreciated that in one embodiment of the present invention, a first process or consumer 30 is dependent upon a second process or rights client 32 to proxy execute at least some portion of code from a third process or provider 50 on behalf of the first process/consumer 30, where the rights client 32 includes a license evaluator 34 or the like. Accordingly, the rights client 32 may choose whether to in fact proxy execute the code from the provider 50 for the consumer 30 based, among other things, on whether the license evaluator 34 has access to a license 36 corresponding to the consumer 30, and on whether the license 36 has permissions or rights that allow or at least do not prohibit the action corresponding to the code to be executed. Again, such a license 36 and the license evaluation 34 of the rights client 32 are known or should be apparent to the relevant public and therefore need not be disclosed herein in any detail.

Figure 7:
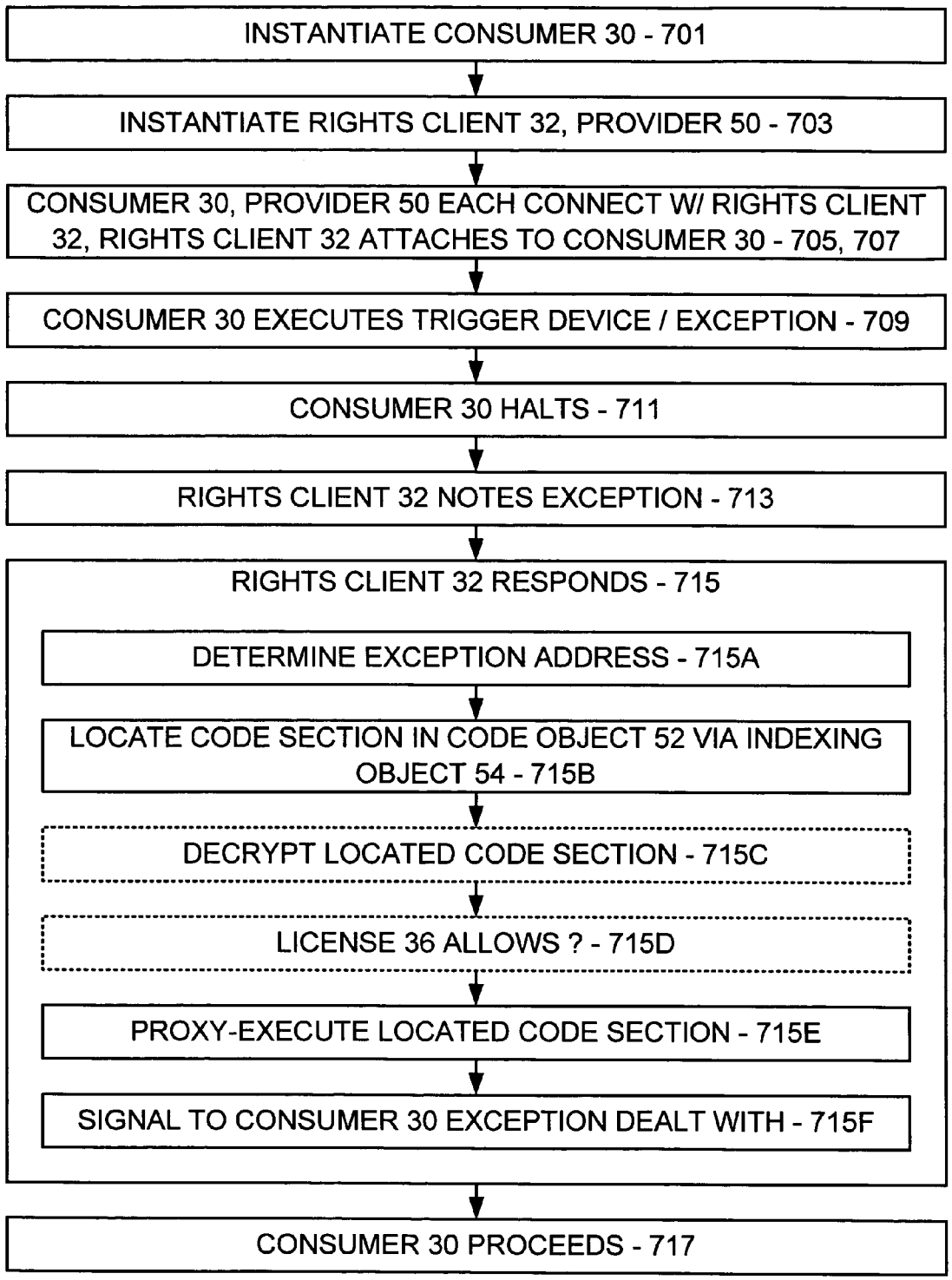
FIG. 7 is a flow diagram showing key steps performed in connection with the first, second, and third processes of FIG. 6 to proxy-execute code in accordance with another embodiment of the present invention.

In one embodiment of the present invention, and referring now to FIG. 7, the consumer 30, rights client 32 with license evaluator 34, and provider 50 are constructed to operate on a computer 110 (FIG. 1) or the like as follows. Typically, either a user or another process on the computer 110 instantiates the consumer 30 on such computer 110 as the aforementioned first process (step 701), and as part of an initializing process such consumer 30 ensures that the rights client 32 with the license evaluator 34 (hereinafter, 'rights client 32') is instantiated on the computer 110 as the aforementioned second process, and also that the provider 50 is instantiated on the computer 110 as the aforementioned third process (step 703). Thereafter, the consumer 30 and the provider 50 each establish a connection with the rights client 32, and in doing so each of the consumer 30 and the provider 50 identifies a link to the other as a consumer-provider relationship (step 705). Note that it may be the case that the rights client 32 and/or the provider 50 are already instantiated or it may be one or more of such items must be newly instantiated, either by the consumer 30, another process, the user, or the like.

Once step 705 is performed, and presuming that a license 36 corresponding to the consumer 30 is available to the rights client 32, the consumer 30 can query the rights client 32 to have the license evaluator 34 thereof determine based on the license 36 the rights the consumer 30 has based on such license 36. Alternatively, such rights may be determined at a later time. Note here that the rights client 32 may itself locate the license 36 or the consumer 30 may identify the license 36 to the rights evaluator 32.

In the present invention, the rights client 32 is required to proxy-execute at least some portions of code from the provider 50 on behalf of the consumer 30 so that the consumer 30 is dependent both on the rights client 32 and the provider 50. By requiring the rights client 32 to proxy-execute at least some portion of code from the provider 50 on behalf of the consumer 30, both the rights client 32 is necessary to review the license 36, and the provider 50 is necessary to provide the portion of the code to be proxy-executed by the rights client 32.

In one embodiment of the present invention, all of the code that the rights client 32 is to proxy-execute on behalf of the consumer 30 is set forth as at least one code object 52 at an appropriate location in the provider 50. If need be, at least one associated indexing objects 54 is also set forth at an appropriate location of the provider 50, where the indexing object 54 is provided for indexing into the code object 52 in an appropriate manner. Thus, and again, the provider 50 must be available to the rights client 32 for same to proxy-execute the code in the data object 52 thereof on behalf of the consumer 30. As was set forth above, such code in the code object 52 may be encrypted, in which case the license 36 or the like may provide a decryption key for decrypting such encrypted code.

Figure 8:
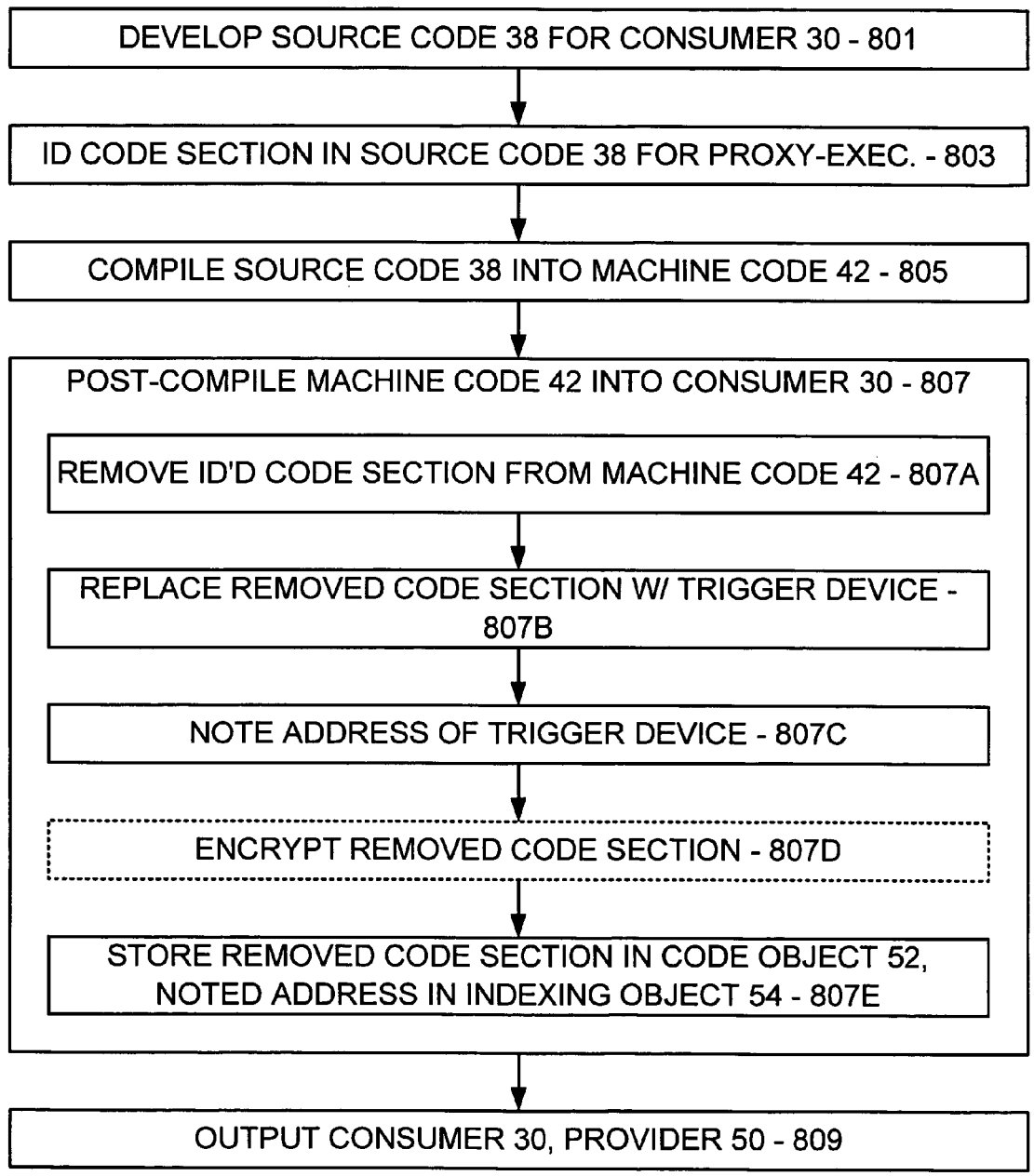
FIG. 8 is a flow diagram showing key steps performed to develop the first and third processes of FIG. 6 in accordance with another embodiment of the present invention.

As should again be appreciated, in order to effectuate proxy-execution of code from a provider 50 on behalf of a consumer 30, the consumer 30 must be pre-processed to define the code that is to be proxy-executed, to remove same from such consumer 30, to appropriately store such removed code in the code object 52 of the provider 50, to appropriately construct the associated indexing object 54 if necessary, and to appropriately store the code object 52 and any indexing object 54 with the provider 50. In one embodiment of the present invention, then, and turning now to FIG. 8, a method of pre-processing the consumer 30 to effectuate proxy-execution is shown.

Preliminarily, and again, a developer develops source code 38 (FIG. 3) for the consumer 30 in an appropriate programming language, such as for example a C-type program-language (step 801). In doing so, and significantly, the developer identifies within such source code 38 for the consumer 30 each of one or more code sections that is to be proxy-executed (step 803). As may be appreciated, each such proxy-executed code section identification may comprise any appropriate mark, tag, command, or the like without departing from the spirit and scope of the present invention. Thereafter, the developer compiles the source code 38 with a compiler 40 into machine code 42 (step 805).

Again, the developer may identify each code section within the source code 38 based on any particular criteria without departing from the spirit and scope of the present invention. For example, if the developer merely wishes to trigger proxy-execution from time to time so as to ensure that the rights client 32 is present and is allowing the consumer 30 to operate based on a corresponding license 36, and also to ensure that the provider 50 is present, each such identified code section may be decided upon in a fairly random manner. However, if the developer wishes to trigger proxy-execution at specific times and/or with regard to specific sections of code, each such identified code section must be decided upon in a more targeted manner. Note with regard to the latter that it may be the case that an identified code section specifies a particular license right. In such a situation, it may also be the case that the rights client 32 will proxy-execute such identified code section only if the specified license right in the license 36 is met.

As may again be appreciated, the compiler 40 may be any appropriate compiler without departing from the spirit and scope of the present invention. Significantly, the compiler 40 is constructed to maintain each code section identification in the machine code 42 so that post-compile processing may be performed on the code section identified thereby. Such maintaining again may be performed in any appropriate manner without departing from the spirit and scope of the present invention. For example, the compiler 40 may pass the identification from the source code 38 to the machine code 42 in a recognizable form, or may create a scratch table (not shown) with such information therein.

Thus, and in one embodiment of the present invention, after such compiling, the developer post-compiles the machine code 42 with each recognizable code section identification therein with a post-compiler 44 into the final code representative of the consumer 30, where the post-compiler 44 removes each identified code section in the machine code 42 from such consumer 30 and appends the removed code section to the code object 52 of the provider 50 (step 807). As may be appreciated, such post-compiler 44 is constructed to retrieve each code section identification, either from the machine code 42, the aforementioned scratch table, or elsewhere, and operate based thereon.

In one embodiment of the present invention, for each identified code section in the machine code 42, the post-compiler 44 removes the identified code section from the machine code 42 (step 807*a*), replaces the removed code section with a triggering device (step 807*b*), notes an address of the triggering device within the consumer 30 (step 807*c*), and stores the removed code section in the code object 52 of the provider 50 and the noted address in the indexing object 54 of the provider 50 as necessary (FIG. 6) or the like (step 807*e*). If indeed such noted address is stored in such indexing object 54, step 807*e* may also encompass creating a reference in the indexing object 54 to the location of the removed code section in the code object 52. Also, if necessary or advisable, each removed code section may be stored in the code object 52 in an encrypted form decryptable by the rights client 32 (step 807*d*). Note that the code object 52 and/or the indexing object 54 may be signed or otherwise protected from alteration by a verifying device such as a hash.

As may be appreciated, and as shown in FIG. 6, for the post-compiler 44 to perform the actions of step 807 et seq., such post-compiler should be provided with the provider 50. In addition, for the consumer 30 and the provider 50 to identify a link to the other as a consumer-provider relationship as at step 705, the post-compiler 44 in the course of operation thereof as at step 807 should insert such an identification within each of the consumer 30 and the provider 50.

As may also be appreciated, and again, by replacing each removed code section from the consumer 30 with the triggering device, and presuming that the triggering device is shorter than the removed code section, the post-compiler 44 shortens the machine code 42 for such consumer 30. Note that the triggering device may be any appropriate triggering device without departing from the spirit and scope of the present invention, as long as the triggering device is recognizable as a signal that the rights client 32 is needed to proxy-execute the corresponding removed code section in the provider 50 on behalf of the consumer 30. For example the triggering device may be a particular exception that would get the attention of the rights client 32.

After the post-compiler 44 is finished, and as should now be appreciated, such post-compiler 44 outputs final code representative of the consumer 30 and the provider 50 (step 809). To summarize quickly, the consumer 30 as issued by the post-compiler 44 includes linking information to the provider 50 and triggering devices in place of removed code sections thereof, and the provider 50 as issued by the post-compiler 44 includes linking information to the consumer 30, a data object 52 with the removed code sections, and perhaps an indexing object 54 or the like to index from the triggering devices to the corresponding code sections in the data object 52. In addition, if the code sections within the data object 52 are encrypted, the post-compiler 44 may provide a decryption key to be placed in a corresponding license 36 in an appropriate manner.

Thus, and returning now to FIG. 7, during runtime, and after the consumer 30, the rights client 32, and the provider 50 have been instantiated, the rights client 32 attaches itself to the consumer 30 in the manner of a debugger or the like so that the rights client 32 can monitor the consumer 30 for when each triggering device/exception therein is executed (step 707). As may be appreciated, the rights client 32 monitors the consumer 30 for the particular triggering device/exception (hereinafter, 'exception') that signals that the rights client 32 is to proxy-execute code in the provider 50 on behalf of the consumer 30. Thus, on every exception as generated by the consumer 30, the rights client 32 determines whether the exception source is a removed code section available from the provider 50, and if so the rights client 32 locates the removed code section at the provider 50 and proxy-executes same, presuming the license 36 so allows.

In an alternate embodiment of the present invention, and as before, the rights client 32 does not attach itself to the consumer 30 to monitor for an exception, but instead receives the exception from an operating system operating the computer 110. However, and again, such an arrangement is indirect and therefore slower. Another alternative would be to have each triggering device be a call to the rights client 32, although such a strategy is again slightly more complex as compared to an exception and is more prone to attack by a nefarious entity.

At some point, and as before, the consumer 30 may explicitly request permission to operate from the rights client 32 based on the license 36. In response, the rights client 32 searches for the license 36, the license evaluator 34 evaluates such license 36, and the rights client 32 returns such requested permission if the evaluation of the license evaluator 34 is positive. Note again, though, that such explicit request for permission and response are ancillary to the present invention. Rather, in the present invention, the rights client 32 is actuated based on an exception or the like from the consumer 30 and not based on an explicit request from the consumer 30. Thus, in the present invention, the rights client 32 can withhold performance of a function on behalf of the consumer 30 even when the consumer 30 never requested permission to perform such function.

At any rate, in the course of operating, the consumer 30 at some point executes an exception in the code thereof, where such exception was placed in the consumer 30 by the post-compiler 44 in place of a removed identified code portion (step 709). As should be understood, upon executing the exception, the consumer 30 halts until receiving notice that the exception has been dealt with (step 711). Inasmuch as the rights client 32 is attached to the operating consumer 30 and is listening for such exception from such consumer 30, such rights client 32 notes the exception (step 413) and responds thereto (step 415).

In particular, and similar to before, to respond to the exception, the rights client first determines the address of the exception within the consumer 30 (step 715a), locates the corresponding code section in the data object 52 of the provider 50 based on such address and the indexing object 54 if necessary (step 715b), proxy-executes such corresponding code section at the provider 50 on behalf of the consumer 30 (step 715e), and then signals to the consumer 30 that the exception has been dealt with (step 715f). As may be appreciated, the consumer 30 may then proceed (step 717). Note that if the corresponding code section is encrypted, the rights client 32 must decrypt the located corresponding code section before proxy-executing same (step 715c). Note, too, that a particular code section may again require that the license evaluator 34 of the rights client 32 first verify that the license 36 grants the rights necessary to proxy-execute such code section on behalf of the consumer 30 (step 715d). As may be appreciated, the rights client 32 proxy-executes such code section only if the license grants the right to do so. Otherwise, the rights client 32 declines to do so. In the latter case, it may be that the rights client 32 returns an appropriate message to the consumer 30.

It is again to be appreciated that a rights client 32 should not be proxy-executing any arbitrary code section, especially inasmuch as the rights client 32 should be especially secure and therefore could have a relatively large amount of operating rights with respect to the computer 110. Put another way, the rights client 32 should not be performing actions that the consumer 30 would not have operating rights to perform, such as altering certain system registers, accessing memory areas of other applications and the operating system, and the like. Accordingly, in one embodiment of the present invention, the post-compiler 44 during operation thereof ensures that each code section removed and stored thereby is not of a sensitive nature. For example, it may be the case that the post-compiler 44 during operation thereof ensures that each such code section does not affect system memory. Of course, other bases for filtering code sections may be employed without departing from the spirit and scope of the present invention. Note that if a code section includes sensitive code, it may be that the post-compiler isolates such sensitive code and removes only sub-portions of code on either side of the sensitive code.

In one embodiment of the present invention, the rights client 32 proxy-executes code in the provider 50 on behalf of the consumer 30 only if a valid license 36 corresponding to such consumer 30 is available to the rights client 32. In such a case, it may be that the purpose of each exception and proxy-execution based thereon is merely to occasionally check that the license 36 is still present and still valid, and that the provider 50 is also present and operating. In an alternate embodiment, the rights client 32 proxy-executes on behalf of the application without regard to any corresponding valid license 36. In such a case, it may be that the purpose of each exception and proxy-execution based thereon is merely to tie the consumer 30 to the rights client 32 and to the provider 50.

In one embodiment of the present invention, and as before, the consumer 30 as produced by the post-compiler 44 may include multiple types of exceptions, each triggering the rights client 32. However, each different type of exception is handled differently. For one example, and recognizing that the consumer 30 may be tied to multiple providers 50, each type of exception may correspond to code to be executed from a particular provider 50.

As disclosed herein, the rights client 32 proxy-executes code from a provider 50 on behalf of a consumer 30. Alternatively, and again, the rights client 32 may operate to modify the consumer 30 to include the to-be-executed code, allow such consumer 30 to execute such code, and then again modify the consumer 30 to remove such code. Note again, though, that such an arrangement may be more susceptible to attack by a nefarious entity, especially in the moments when the consumer 30 is modified to include the to-be-executed code.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a method and mechanism are provided by which a rights client 32 with a license evaluator 34 controls operation and use of an consumer 30 based on a license 36 corresponding thereto. The rights client 32 with the license evaluator 34 executes certain portions of code from a provider 50 on behalf of and as a proxy for the consumer 30, where the license evaluator 34 can determine if the license 36 allows such execution. Thus, the consumer 30 cannot be run outside of the presence of the provider 50.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A computer-readable storage medium having stored thereon instructions that when executed by a processor cause said processor to perform a method, the method comprising:
    creating a first process by:
        compiling source code of an application, the source code including one or more identifiers, each identifier identifying a section of the source code to be proxy-executed;
        removing one or more identified sections of a machine code resulting from the compiling corresponding to the sections of the source code to be proxy-executed; and inserting one or more triggering devices corresponding to each identified section of machine code;

establishing a connection between a second process on the computer and the first process;

establishing a connection between the second process and a third process, the connections linking the first process to the third process ensuring that first process is operated only in conjunction with the third process;

storing, in the third process, the machine code corresponding to each triggering device of the first process and an address of the triggering device in the first process;

executing the first process according to terms and conditions of a corresponding digital license; and using the second process operating on the computer to proxy-execute code corresponding to each triggering device of the first process on behalf of such first process, the second process including a license evaluator for evaluating the license to determine whether the first process is to be operated in accordance with the terms and conditions set forth in such license, the second process choosing whether to in fact proxy-execute the code corresponding to each triggering device of the first process on behalf of such first process based at least in part on whether the license evaluator has determined that the first process is to be operated in accordance with the terms and conditions of the license.

2. The computer-readable storage medium of claim 1 wherein the first process is an application and the second process is a rights client.

3. The computer-readable storage medium of claim 1 wherein the third process is one of another application, an executable, a data library, and a data file.

4. The computer-readable storage medium of claim 1 wherein the third process includes a code object having the code corresponding to each triggering device of the first process, and an indexing object indexing the address of the triggering device in the first process to the code in the code object.

5. The computer-readable storage medium of claim 4 wherein the code corresponding to each triggering device of the first process is encrypted within the code object and is decryptable according to a decryption key obtainable by the second process.

6. The computer-readable storage medium of claim 5 wherein the license includes the decryption key encrypted in a manner decryptable by the second process.

7. A method for proxy executing code comprising:

creating a first process by:

compiling source code of an application, the source code including one or more identifiers, each identifier identifying a section of the source code to be proxy-executed;

removing one or more identified sections of a machine code resulting from the compiling corresponding to the sections of the source code to be proxy-executed;

inserting one or more triggering devices corresponding to each identified section of machine code;

establishing a connection between a second process on the computer and the first process;

establishing a connection between the second process and a third process, the connections linking the first process to the third process ensuring that first process is operated only in conjunction with the third process;

storing, in the third process, the machine code corresponding to each triggering device of the first process and an address of the triggering device in the first process; and using the second process to monitor for when the first process executes a triggering device thereof;

the first process executing a triggering device and halting;

the second process noting the triggering device being executed by the first process and responding thereto by:

determining an address of the triggering device within the first process;

locating in the third process the code section corresponding to the triggering device based on the determined address;

proxy-executing the located code section on behalf of the first process; and signaling to the first process that the triggering device has been dealt with; and resuming execution of the first process whereby the first process is dependent upon the second process for operation thereof.

8. The method of claim 7 wherein the computer further includes a digital license corresponding to the first process, the license setting forth terms and conditions for operating the first process, the method further comprising the second process evaluating the license and verifying that the first process is operating in accordance with the terms and conditions set forth in such license prior to proxy-executing the located code section on behalf of the first process.

9. The method of claim 7 wherein the located code section is encrypted, the method further comprising the second process decrypting the located code section before proxy-executing same.

10. The method of claim 7 wherein each triggering device is a particular exception and comprising the second process monitoring for when the first process executes the particular exception.

11. The method of claim 10 further comprising the second process attaching to the first process so as to monitor the first process for the particular exception directly.

12. The method of claim 7 wherein each triggering device is one of a plurality of types of exceptions and comprising the second process monitoring for when the first process executes any of the types of exceptions, the second process responding to each type of exception in a differing manner.

13. The method of claim 7 wherein the computer further includes a digital license corresponding to the first process, the license setting forth terms and conditions for operating the first process, and wherein the second process proxy-executing the located code section on behalf of the first process comprises the second process securely retrieving a term or condition from the license and employing same on behalf of the first process.

* * * * *